US012658970B2

(12) United States Patent  
Kang

(10) Patent No.: US 12,658,970 B2  
(45) Date of Patent: Jun. 16, 2026

(54) MULTI-CHANNEL TRANSCEIVER

(71) Applicant: ELECTRONICS AND TELECOMMUNICATIONS RESEARCH INSTITUTE, Daejeon (KR)

(72) Inventor: Dongwoo Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 18/329,961

(22) Filed: Jun. 6, 2023

(65) Prior Publication Data

US 2024/0030961 A1 Jan. 25, 2024

(30) Foreign Application Priority Data

Jul. 21, 2022 (KR) ........................ 10-2022-0090584

(51) Int. Cl.  
*H04B 1/405* (2015.01)  
*H04B 1/54* (2006.01)

(52) U.S. Cl.  
CPC .............. *H04B 1/405* (2013.01); *H04B 1/54* (2013.01)

(58) Field of Classification Search  
CPC .................................. H04B 1/405; H04B 1/54  
See application file for complete search history.

(56) References Cited

U.S. PATENT DOCUMENTS

| | | | |
|---|---|---|---|
| 8,723,602 B2 | 5/2014 | Chen | |
| 10,495,685 B2 | 12/2019 | Kang et al. | |
| 11,444,652 B1 * | 9/2022 | Kaiser, Jr. ............ | H03D 7/1441 |
| 2005/0014466 A1 * | 1/2005 | Park ........................ | H04B 1/28 |
| | | | 455/20 |
| 2006/0098986 A1 | 5/2006 | Jung et al. | |
| 2007/0149143 A1 | 6/2007 | Kim et al. | |
| 2008/0254759 A1 * | 10/2008 | Kintis ...................... | H04B 1/28 |
| | | | 455/326 |
| 2017/0171791 A1 * | 6/2017 | Li .......................... | H04W 36/06 |
| 2018/0156861 A1 * | 6/2018 | Kang .................... | H04L 27/156 |
| 2021/0356557 A1 | 11/2021 | Samala et al. | |
| 2025/0167458 A1 * | 5/2025 | Fujishima ............ | H01Q 21/065 |

FOREIGN PATENT DOCUMENTS

| | | |
|---|---|---|
| KR | 20070043445 A | 4/2007 |
| KR | 10-2011-0107493 A | 10/2011 |
| KR | 20130142617 A | 12/2013 |

* cited by examiner

*Primary Examiner* — Nguyen T Vo

(74) *Attorney, Agent, or Firm* — Rabin & Berdo, P.C.

(57) ABSTRACT

Disclosed is a transceiver including a transmitter, a receiver, and a local signal transfer unit, the transmitter includes a first mixer that receives a transmission frequency signal including transmission data and a first local oscillation signal to output a transmission conversion signal, and the local signal transfer unit includes a local signal oscillator that generates a reference oscillation signal, a power divider that divides the reference oscillation signal to generate distribution signals, a first balun that receives a first distribution signal of the distribution signals to generate a first signal, and a first multiplier that receives the first signal from the first balun to output the first local oscillation signal by converting a frequency of the first signal.

19 Claims, 3 Drawing Sheets

MULTI-CHANNEL TRANSCEIVER

CROSS-REFERENCE TO RELATED APPLICATIONS

This application claims priority under 35 U.S.C. § 119 to Korean Patent Application No. 10-2022-0090584, filed on Jul. 21, 2022, in the Korean Intellectual Property Office, the disclosures of which are incorporated by reference herein in their entireties.

BACKGROUND

Embodiments of the present disclosure described herein relate to a device for transmitting and receiving a frequency signal in a terahertz band, and more particularly, relate to a multi-channel transceiver that transmits and receives a signal in a terahertz band using a local signal generated from a local signal oscillator.

Recently, as interest in 6G (sixth generation networks) technology increases, research using a frequency of 100 GHz or more is being actively conducted. In a case of 5G, the number of transmission and reception channels is also increasing to apply millimeter wave band frequencies and beamforming technology, and even in the case of 6G, development of multi-channel transceiver chips is in progress to improve output power and an SNR (Signal to Noise Ratio) of a receiver. As the number of transmission channels and reception channels increases, the distance from a local oscillator to a mixer of the transmission channel and a mixer of the reception channel increases. Therefore, the length until the local oscillation signal is applied to the mixers becomes long, resulting in large loss, and an additional amplifier operating at a frequency of 100 GHz or more should be used.

SUMMARY

Embodiments of the present disclosure provide to reduce power loss occurring in the process of applying a local oscillation signal from a local oscillator to a mixer.

The problems that are achieved through present disclosure may not be limited to what has been particularly described herein, and other problems not described herein may be more clearly understood from the following detailed description by persons skilled in the art.

According to an embodiment of the present disclosure, a transceiver including a transmitter, a receiver, and a local signal transfer unit, the transmitter includes a first mixer that receives a transmission frequency signal including transmission data and a first local oscillation signal to output a transmission conversion signal, and the local signal transfer unit includes a local signal oscillator that generates a reference oscillation signal, a power divider that divides the reference oscillation signal to generate distribution signals, a first balun that receives a first distribution signal of the distribution signals to generate a first signal, and a first multiplier that receives the first signal from the first balun to output the first local oscillation signal by converting a frequency of the first signal.

According to an embodiment of the present disclosure, a method of providing a local oscillation signal to a mixer, which includes generating a reference oscillation signal from the local signal oscillator, generating distribution signals from a power divider by receiving the reference oscillation signal, generating a differential signal from a balun by receiving a first distribution signal among the distribution signals, and receiving the differential signal, outputting the local oscillation signal from a multiplier, and providing the local oscillation signal to the mixer.

BRIEF DESCRIPTION OF THE FIGURES

A detailed description of each drawing is provided to facilitate a more thorough understanding of the drawings referenced in the detailed description of the present disclosure.

DETAILED DESCRIPTION

To fully understand the configuration and effects of the present disclosure, preferred embodiments of the present disclosure will be described in detail with reference to the accompanying drawings.

The present disclosure is not limited to the embodiments disclosed below, but may be implemented in various forms and various modifications and changes may be applied. However, it is provided to complete the disclosure of the present disclosure through the description of the present embodiment, and to completely inform those skilled in the art of the scope of the disclosure to which the present disclosure belongs. In the accompanying drawings, for convenience of description, the size of the components is illustrated larger than the actual size, and the ratio of each component may be exaggerated or reduced.

Further described herein will be described with reference to cross-sectional and/or plan views, which are ideal illustrative views of the present disclosure. Although terms such as first, second, and third are used to describe various components in various embodiments of the present specification, these components should not be limited by these terms. These terms are only used to distinguish one component from another component. Embodiments described and illustrated herein also include complementary embodiments thereof.

Figure 1:
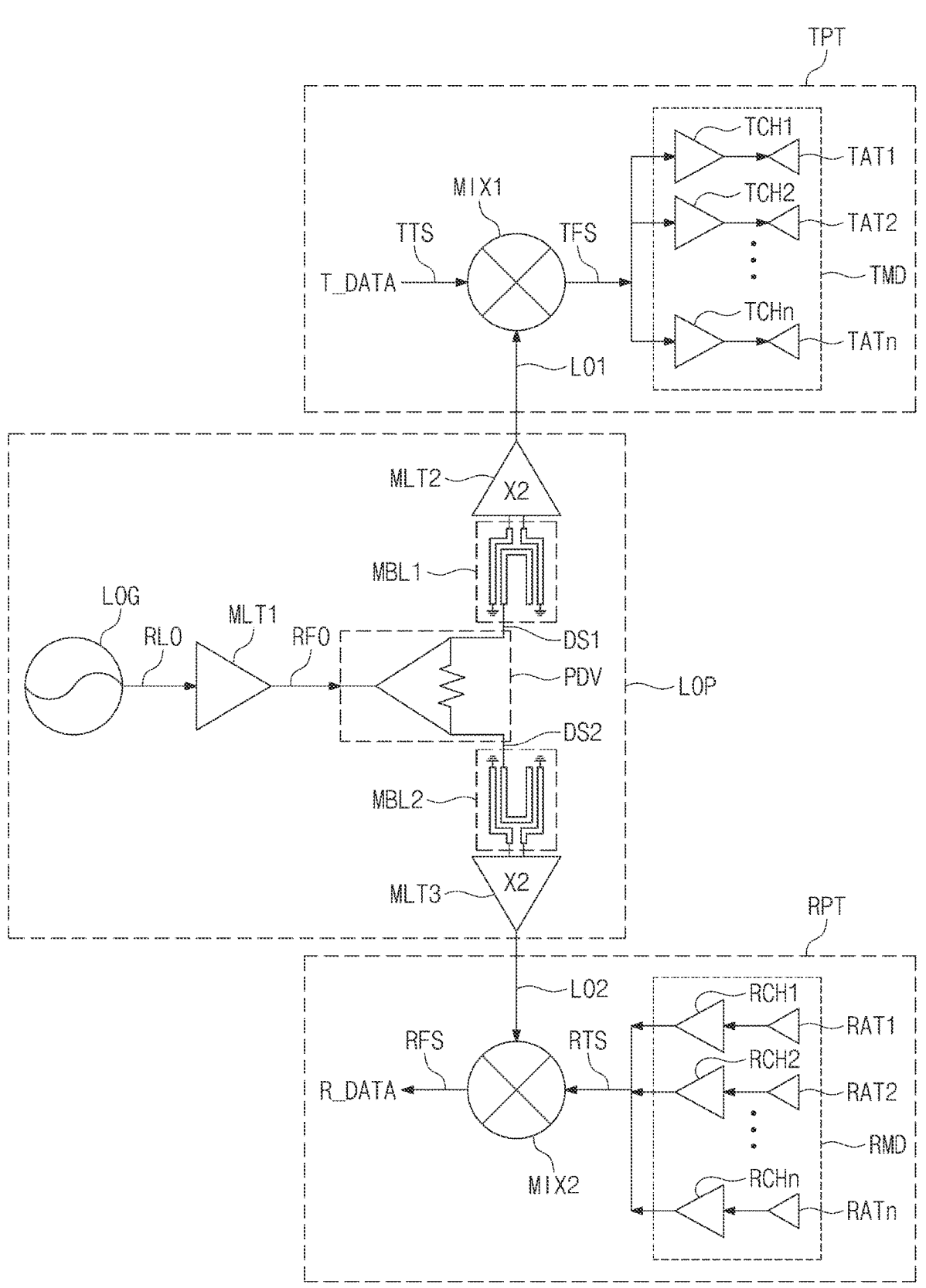
FIG. 1 is a diagram illustrating an embodiment of a multi-channel transceiver, according to the present disclosure.

FIG. 1 is a diagram illustrating an embodiment of a multi-channel transceiver, according to the present disclosure. Hereinafter, an embodiment of the present disclosure will be described with reference to FIG. 1.

In an embodiment according to the present disclosure, a multi-channel transceiver includes a transmitter TPT, a receiver RPT, and a local signal transfer unit LOP. In an embodiment, the multi-channel transceiver may transmit a transmission conversion signal TFS through the transmitter TPT, may receive an external signal through the receiver RPT to process the received data (R_DATA1, R_DATA2, . . . , R_DATAn).

The transmitter TPT may include a first mixer MIX1, a transmission module TMD, and a plurality of transmission antennas TAT1 to TATn. The first mixer MIX1, the transmission module TMD, and the transmission antennas TAT1 to TATn may be connected in series to each other. Each of the plurality of transmission antennas TAT1 to TATn may be connected in parallel to each other. The transmitter TPT may perform a frequency conversion on a transmission frequency signal TTS including transmission data T_DATA through the first mixer MIX1 to output the transmission conversion signal TFS, and may radiate the transmission conversion signal TFS to the outside of the transceiver through the transmission module TMD and the transmission antennas TAT1 to TATn.

The transmitter TPT may receive the transmission data T_DATA to generate the transmission frequency signal TTS.

The first mixer MIX1 may be configured to convert a frequency of the transmission frequency signal TTS and to output the transmission conversion signal TFS. The first mixer MIX1 may receive a first local oscillation signal LO1 from the local signal transfer unit LOP, which will be described later. The first mixer MIX1 may beat the frequency of the transmission frequency signal TTS with a frequency of the first local oscillation signal LOL.

In an embodiment, the frequency of the transmission conversion signal TFS output from the first mixer MIX1 may be the same as the sum of the frequency of the transmission frequency signal TTS and the frequency of the first local oscillation signal LO1. For example, when the frequency of the transmission frequency signal TTS is 10 GHz and the frequency of the first local oscillation signal LO1 is 100 GHz, the transmission conversion signal TFS output from the first mixer MIX1 may have a frequency of 110 GHz. For example, the transmission conversion signal TFS may include a millimeter wave signal or a terahertz wave signal.

The transmission module TMD may include a plurality of transmission channels (TCH1, TCH2, . . . , TCHn). The transmission module TMD may be configured to receive the transmission conversion signal TFS and to output the transmission conversion signal TFS to a plurality of transmission antennas TAT1 to TATn. For example, the transmission module TMD may include first to n-th transmission channels (TCH1, TCH2, . . . , TCHn). The transmission module TMD may receive the transmission conversion signal TFS through the plurality of transmission channels (TCH1, TCH2, . . . , TCHn). Each transmission channel may receive the transmission conversion signal TFS corresponding thereto. For example, the first transmission channel TCH1 may receive a first transmission conversion signal, the second transmission channel TCH2 may receive a second transmission conversion signal, and the n-th transmission channel TCHn may receive an n-th transmission conversion signal in the same manner as described above. Each of the first to n-th transmission conversion signals may include different transmission data.

Each of the transmission antennas TAT1 to TATn may radiate the transmission conversion signal TFS corresponding thereto to the outside of the transceiver. For example, the transmission antennas TAT1 to TATn may include horn-type antennas.

The receiver RPT may include a second mixer MIX2, a reception module RMD, and reception antennas RAT1 to RATn. The second mixer MIX2, the reception module RMD, and the reception antennas RAT1 to RATn may be connected in series to each other. The receiver RPT may receive a reception frequency signal RTS through the reception antennas RAT1 to RATn, may perform a frequency conversion on the reception frequency signal RTS through the second mixer MIX2, and may output the converted reception frequency signal RTS as reception data (R_DATA1, R_DATA2, . . . , R_DATAn) through the reception module RMD.

The reception antennas RAT1 to RATn may be configured to generate the reception frequency signal RTS by receiving a signal from outside the transceiver. The reception frequency signal RTS may be transmitted to the second mixer MIX2 through the reception module RMD. For example, the reception frequency signals RTS generated by the reception antennas RAT1 to RATn may include a millimeter wave signal or a terahertz wave signal.

The reception module RMD may process the reception conversion signal RFS received from the second mixer MIX2 to output the reception data (R_DATA1, R_DATA2, . . . , R_DATAn).

The reception module RMD may include a plurality of reception channels (RCH1, RCH2, . . . , RCHn). The reception module RMD may be configured to receive the reception frequency signal RTS and to output the received reception frequency signal RTS to the second mixer MIX2. For example, the reception module RMD may include the first to n-th reception channels (RCH1, RCH2, . . . , RCHn). Each reception channel may output reception frequency signals corresponding thereto. For example, the first reception channel RCH1 may output a first reception frequency signal, the second reception channel RCH2 may output a second reception frequency signal, and the n-th reception channel RCHn may output an n-th reception frequency signal in the same manner as described above. Each of the first to n-th reception frequency signals may include different transmission data.

The second mixer MIX2 may be configured to convert a frequency of the reception frequency signal RTS and to output the reception conversion signal RFS. The second mixer MIX2 may receive a second local oscillation signal LO2 from the local signal transfer unit LOP, which will be described later.

In an embodiment, the frequency of the reception conversion signal RFS output from the second mixer MIX2 may be the same as a difference between the frequency of the reception frequency signal RTS and the frequency of the second local oscillation signal LO2. For example, when the frequency of the reception frequency signal RTS is 110 GHz and the frequency of the second local oscillation signal LO2 is 100 GHz, the reception conversion signal RFS output from the second mixer MIX2 may have a frequency of 10 GHz. For example, the reception conversion signal RFS may include a millimeter wave signal or a terahertz wave signal.

The local signal transfer unit LOP may include a local signal oscillator LOG, a power divider PDV, first to third multipliers MLT1, MLT2, and MLT3, and first and second baluns MBL1 and MBL2. The local signal transfer unit LOP may output the local oscillation signals LO1 and LO2 and may provide them to the mixers MIX1 and MIX2 of the transmitter TPT and the receiver RPT.

The local signal oscillator LOG may be configured to generate a reference oscillation signal RLO. The reference oscillation signal RLO may have a frequency of 10 GHz to 50 GHz. The first multiplier MLT1 may receive the reference oscillation signal RLO from the local signal oscillator LOG. The first multiplier MLT1 may be configured to output a reference conversion signal RFO by converting a frequency of the reference oscillation signal RLO by an integer 'n' times. For example, the frequency of the reference conversion signal RFO may have twice the frequency of the reference oscillation signal RLO. In an embodiment, the frequency of the reference conversion signal RFO may be half of the frequency of the local oscillation signals LO1 and LO2 transferred to the transmitter TPT and the receiver RPT.

The power divider PDV may divide the reference conversion signal RFO received from the first multiplier MLT1. For example, the power divider PDV may be configured to generate first and second distribution signals DS1 and DS2 by dividing the received reference conversion signal RFO. The first distribution signal DS1 and the second distribution signal DS2 may have the same frequency and the same phase as the reference conversion signal RFO. The first distribution signal DS1 may be transferred to the first mixer MIX1 of the transmitter TPT through the first balun MBL1 and the second multiplier MLT2, and the second distribution signal DS2 may be transferred to the second mixer MIX2 of the receiver RPT through the second balun MBL2 and the third multiplier MLT3.

The first balun MBL1 may receive the first distribution signal DS1. The first balun MBL1 may be disposed between the power divider PDV and the first mixer MIX1 of the transmitter TPT. The first balun MBL1 may be configured to generate and transfer a first signal to the first mixer MIX1. The first signal may include a pair of differential signals having the same frequency and opposite phases as the first distribution signal DS1. In an embodiment, the first balun MBL1 may include a marchand balun. Embodiments of the first balun will be described later with reference to FIGS. 3 and 4.

The second multiplier MLT2 may be provided between the first balun MBL1 and the first mixer MIX1. The second multiplier MLT2 may be configured to output the first local oscillation signal LO1 by converting the first signal received from the first balun MBL1. The second multiplier MLT2 may output the first local oscillation signal LO1 by converting the frequency of the received first signal by an integer 'n' times. For example, the second multiplier MLT2 may output the first local oscillation signal LO1 by converting the frequency of the first signal by twice the frequency. In an embodiment, the frequency of the first local oscillation signal LO1 may be twice the frequency of the first signal.

For example, the frequency of the first local oscillation signal LO1 may be a frequency of 100 GHz to 10 THz. In this case, in order for the frequency of the first local oscillation signal LO1 to be 100 GHz to 10 THz, the frequency of the reference oscillation signal RFO generated by the local signal oscillator LOG may be adjusted or the frequency conversion multiple of the first multiplier MLT1 may be adjusted.

The second balun MBL2 may receive the second distribution signal DS2, may generate a second signal, and may transfer the second signal to the second mixer MIX2. In an embodiment of the present disclosure, the structures of the first balun MBL1 and the second balun MBL2 may be actually the same, and the structures of the second multiplier MLT2 and the third multiplier MLT3 are also actually the same.

The first local oscillation signal LO1 and the second local oscillation signal LO2 may have the same frequency. An operation of outputting the second distribution signal DS2 as the second local oscillation signal LO2 through the second balun MBL2 and the third multiplier MLT3 may be actually the same as an operation of outputting the first distribution signal DS1 as the first local oscillation signal LO1 through the first balun MBL1 and the second multiplier MLT2.

Figure 2:
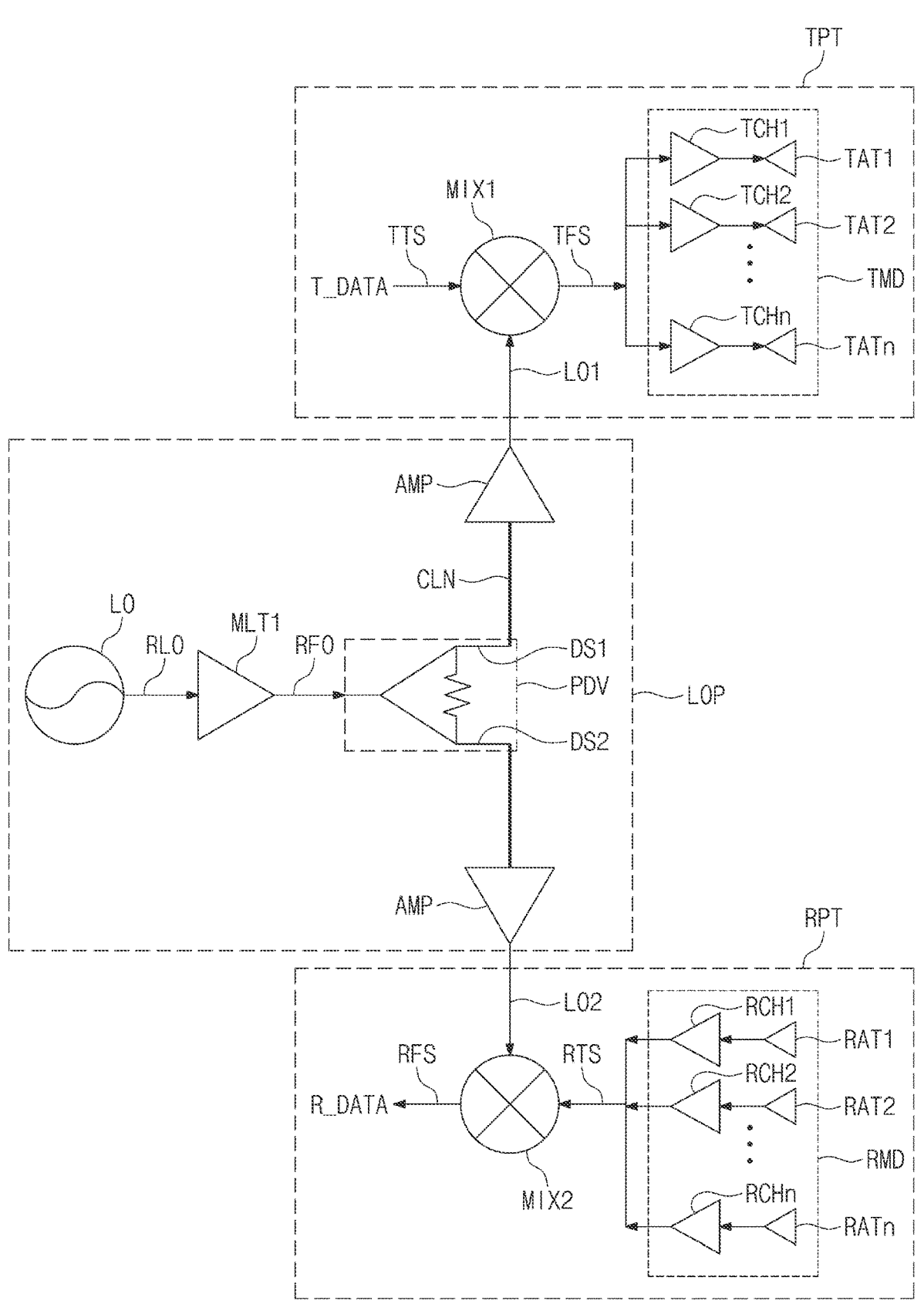
FIG. 2 is a diagram illustrating comparative example of a multi-channel transceiver.

FIG. 2 is a diagram illustrating comparative example of a multi-channel transceiver. Hereinafter, descriptions of actually the same parts as those described with reference to FIG. 1 will be omitted to avoid redundancy.

Referring to FIG. 2, in a comparative example, a multi-channel transceiver may include the transmitter TPT, the receiver RPT, and the local signal transfer unit LOP.

The transmitter TPT may include the transmission antennas TAT1 to TATn, the first mixer MIX1, and the transmission module TMD. The receiver RPT may include the reception antennas RAT1 to RATn, the second mixer MIX2, and the reception module RMD. The transmitter TPT and the receiver RPT of the comparative example may have actually the same structures as the transmitter TPT and the receiver RPT of the present disclosure described with reference to FIG. 1.

In the comparative example, the local signal transfer unit LOP may include the local signal oscillator LOG, the first multiplier MLT1, the power divider PDV, and an amplifier AMP. Compared to the present disclosure, in the comparative example, a balun may not be provided to the local signal transfer unit LOP.

The local signal oscillator LOG may generate the reference oscillation signal RLO. The reference oscillation signal RLO may have a frequency of 10 GHz to 50 GHz. The first multiplier MLT1 may receive the reference oscillation signal RLO from the local signal oscillator LOG. The first multiplier MLT1 may output the reference conversion signal RFO by converting the frequency of the reference oscillation signal RLO by an integer 'n' times. For example, the frequency of the reference conversion signal RFO may have twice the frequency of the reference oscillation signal RLO. In the comparison example, the frequency of the reference conversion signal RFO may be the same as the frequencies of the local oscillation signals LO1 and LO2 transferred to the transmitter TPT and the receiver RPT.

The power divider PDV may divide the reference conversion signal RFO received from the first multiplier MLT1. For example, the power divider PDV may receive the reference conversion signal RFO and may divide it to first and second distribution signals DS1 and DS2. The first distribution signal DS1 and the second distribution signal DS2 may have the same frequency as the reference conversion signal RFO. The first distribution signal DS1 and the second distribution signal DS2 may be provided to the first mixer MIX1 and the second mixer MIX2 through a transmission line CLN.

In the comparison example, as the length of the transmission line CLN increases, more power of the first distribution signal DS1 may be lost on the transmission line CLN. Accordingly, the amplifier AMP may be disposed to compensate for power loss of the first distribution signal DS1 on the transmission line CLN.

The amplifier AMP may amplify the first distribution signal DS1 and the second distribution signal DS2 to output the first local oscillation signal LO1 and the second local oscillation signal LO2. The first local oscillation signal LO1 and the second local oscillation signal LO2 output from the amplifier AMP may be provided to the first mixer MIX1 and the second mixer MIX2, respectively.

According to an embodiment of the present disclosure, a marchand balun may be provided between the power divider and the mixer. In the case of the present disclosure, a multiplier may be provided between the marchand balloon and the mixer. Accordingly, in the case of the present disclosure, the first distribution signal having a half frequency of the local oscillation signal may be transferred to the first mixer through the first balun, and thus power loss occurring on the transmission line may be reduced compared to the comparative example.

In the case of the present disclosure, unlike the comparative example, the amplifier for compensating for a loss occurring in a process of transferring the local oscillation signal from a power divider to a mixer may be removed.

Accordingly, the present disclosure may reduce power consumption due to the use of an additional amplifier that is removed.

Figure 3:
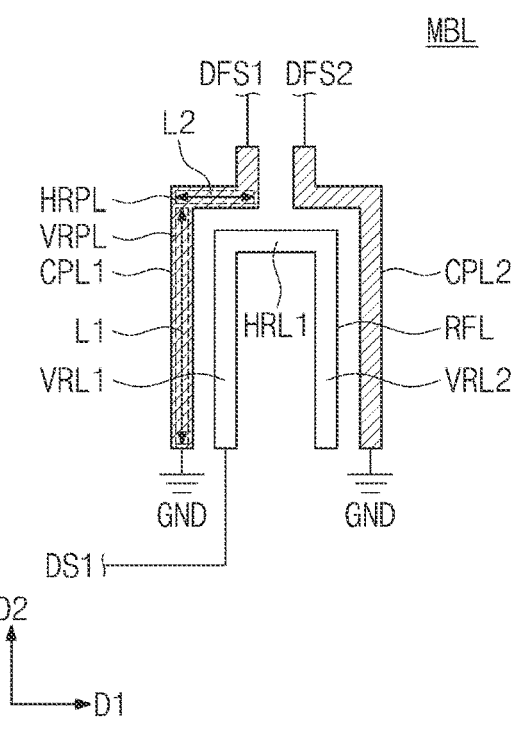
FIG. 3 is a diagram illustrating an embodiment of first and second baluns of FIG. 1.

FIG. 3 is a diagram illustrating an embodiment of first and second baluns of FIG. 1. Hereinafter, an embodiment of the first balun (hereinafter referred to as a 'balun') on behalf of the first balun and the second balun of FIG. 1 will be described in detail.

Referring to FIG. 3, in an embodiment, the balun may include a reception strip RFL, first and second transmission strips CPL1, CPL2. The reception strip RFL may receive signals through one end. For example, as illustrated in FIG. 1, the reception strip RFL may receive a first distribution signal DS1 or a second distribution signal DS2.

In an embodiment, the reception strip RFL may have a "⊏" shape. The reception strip RFL may include a first horizontal strip HRL1 and first and second vertical strips VRL1, VRL2. The first horizontal strip HRL1 may extend in a first direction D1. The first and second vertical strips VRL1, VRL2 may extend in a second direction D2. The first direction D1 and the second direction D2 may be orthogonal to each other.

One ends of the first and second vertical strips VRL1, VRL2 may be respectively connected to both ends of the first horizontal strip HRL1. The reception strip RFL may include a conductive material. For example, the conductive material may include at least one of titanium, tantalum, tungsten, copper, and aluminum.

The first transmission strip CPL1 may include a horizontal portion HRPL extending in a first direction D1 and a vertical portion VRPL extending in a second direction D2. One end of the vertical portion VRPL may be connected to a ground, and the opposite end of the vertical portion VRPL may be connected to one end of the horizontal portion HRPL. The first transmission strip CPL1 may be spaced apart along the reception strip RFL.

The length of the first transmission strip CPL1 may be defined as the sum of the length L2 of the horizontal portion HRPL and the length L1 of the vertical portion VRPL. The length L2 of the horizontal portion HRPL may be defined as a length extending from one end of the horizontal portion HRPL to the opposite end along the first direction. The length L1 of the vertical portion VRPL may be defined as a length extending from one end of the vertical portion VRPL to the opposite end along the second direction.

In an embodiment, the length of the first transmission strip CPL1 may have a length of ¼ of the wavelength of a signal received by the reception strip RFL. For example, the length of the first transmission strip CPL1 may be a quarter of the wavelength of the first distribution signal. The second transmission strip CPL2 may be coupled with the reception strip RFL to generate a first differential signal DFS1.

The second transmission strip CPL2 may have a shape symmetrical to that of the first transmission strip CPL1. Accordingly, the length of the second transmission strip CPL2 may be actually the same as the length of the first transmission strip CPL1. The second transmission strip CPL2 may be coupled with the reception strip RFL to generate a second differential signal DFS2.

The frequency of the first differential signal DFS1 and the frequency of the second differential signal DFS2 may be the same. The phase of the first differential signal DFS1 may lead the phase of the second differential signal DFS2 by 180 degrees. In other words, the first differential signal DFS1 and the second differential signal DFS2 may have opposite phases.

The first and second transmission strips CPL1, CPL2 may include a conductive material. For example, the conductive material may include at least one of titanium, tantalum, tungsten, copper, and aluminum.

Figure 4:
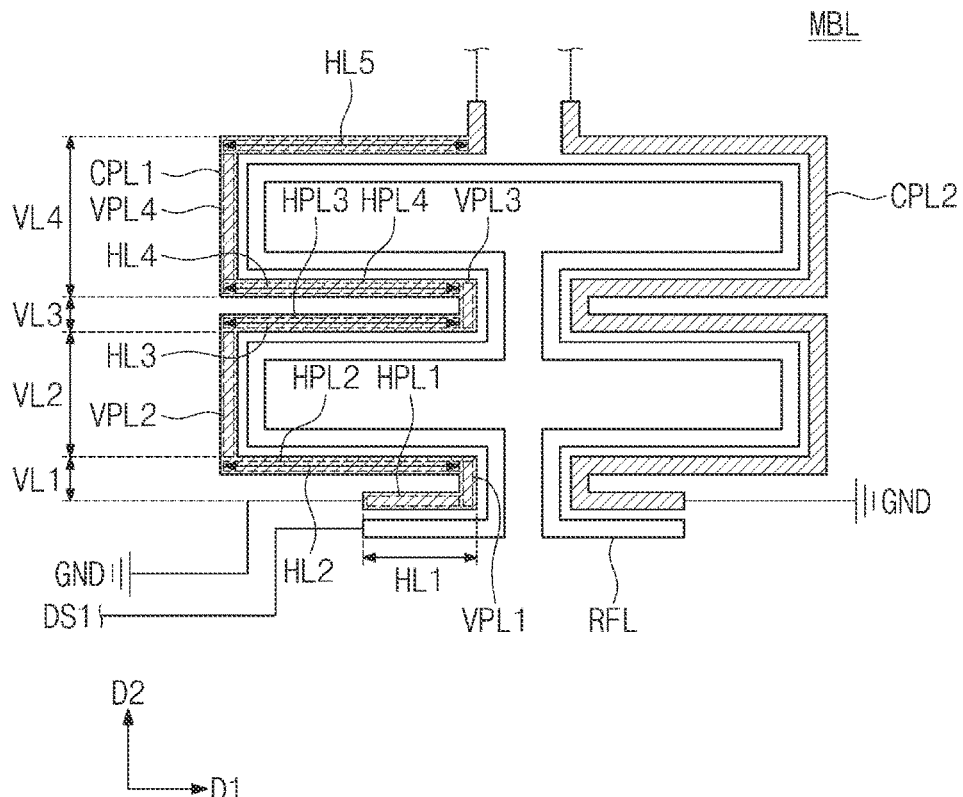
FIG. 4 is a diagram illustrating another embodiment of a balun.

FIG. 4 is a diagram illustrating another embodiment of a balun. Hereinafter, an embodiment of a balun will be described in detail.

Referring to FIG. 4, in an embodiment, the balun may include a reception strip RFL, and first and second transmission strips CPL1, CPL2. The reception strip RFL may receive signals through one end. For example, as illustrated in FIG. 1, the reception strip RFL may receive the first distribution signal DS1.

In an embodiment, the reception strip RFL may have a meandered shape. The reception strip RFL may have a left-right symmetrical shape.

The first transmission strip CPL1 may include first to fifth horizontal portions HPL1-HPL5 extending in a first direction and first to fourth vertical portions VPL1-VPL4 extending in a second direction. The first transmission strip CPL1 may be spaced apart along the reception strip RFL.

One end of the first horizontal portion HPL1 may be connected to the ground, and an opposite end of the first horizontal portion HPL1 may be connected to one end of the first vertical portion VPL1. The opposite end of the first vertical portion VPL1 may be connected to one end of the second horizontal portion HPL2, and the opposite end of the second horizontal portion HPL2 may be connected to one end of the second vertical portion VPL2. The opposite end of the second vertical portion VPL2 may be connected to one end of a third horizontal portion HPL3, and an opposite end of the third horizontal portion HPL3 may be connected to the one end of the third vertical portion VPL3. The opposite end of the third vertical portion VPL3 may be connected to one end of a fourth horizontal portion HPL4, and an opposite end of the fourth horizontal portion HPL4 may be connected to the one end of the fourth vertical portion VPL4. The opposite end of the fourth vertical portion VPL4 may be connected to one end of the fifth horizontal portion HPL5.

The first to fifth horizontal portions HPL1-HPL5 may have first to fifth horizontal lengths, respectively. The third horizontal length and the fourth horizontal length may be actually the same. The first to fourth vertical portions VPL1-VPL4 may have first to fourth vertical lengths, respectively.

The length of the first transmission strip CPL1 may be defined as the sum of the lengths of the horizontal portion HRPLs and the lengths of the vertical portion VRPLs. The length of each of the horizontal portion HRPLs may be defined as a length extending from one end of the horizontal portion HRPL to an opposite end along the first direction. The length of each of the vertical portions may be defined as a length extending from one end of the vertical portion to the opposite end along the second direction.

In an embodiment, the length of the first transmission strip CPL1 may have a length of ¼ of the wavelength of a signal received by the reception strip RFL. For example, the length of the first transmission strip CPL1 may be a quarter of the wavelength of the first distribution signal. The second transmission strip CPL2 may be coupled with the reception strip RFL to generate a first differential signal.

The second transmission strip CPL2 may have a shape symmetrical to that of the first transmission strip CPL1. Accordingly, the length of the second transmission strip CPL2 may be actually the same as the length of the first transmission strip CPL1. The second transmission strip CPL2 may be coupled with the reception strip RFL to generate a second differential signal.

The frequency of the first differential signal and the frequency of the second differential signal may be the same. The phase of the first differential signal may lead the phase of the second differential signal by 180 degrees. In other words, the first differential signal and the second differential signal may have opposite phases.

According to an embodiment of the present disclosure, a first distribution signal having a half frequency of a local oscillation signal can be transmitted to the mixer through a marchand balun, and thus, power loss occurring on the transmission line may be reduced.

The effects that are achieved through present disclosure may not be limited to what has been particularly described herein, and other effects not described herein may be more clearly understood from the following detailed description by persons skilled in the art.

The above descriptions are specific embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. Therefore, the scope of the present disclosure should not be limited to the above-described embodiments, but should be defined by the claims described below as well as the claims and equivalents of the present disclosure.

What is claimed is:

1. A transceiver comprising a transmitter, a receiver, and a local signal transfer unit, and wherein the transmitter includes:

a first mixer configured to receive a transmission frequency signal including transmission data and a first local oscillation signal to output a transmission conversion signal, and wherein the local signal transfer unit includes:

a local signal oscillator configured to generate a reference oscillation signal;

a power divider configured to divide the reference oscillation signal to generate distribution signals;

a first balun configured to receive a first distribution signal of the distribution signals to generate a first signal; and a first multiplier configured to receive the first signal from the first balun to output the first local oscillation signal by converting a frequency of the first signal;

wherein the local signal transfer unit further includes a third multiplier, the third multiplier is configured to receive the reference oscillation signal to output a reference conversion signal, and the power divider is configured to receive the reference conversion signal to generate the distribution signals, wherein the first balun includes a reception strip and a first transmission strip, wherein the reception strip is configured to receive the first distribution signal and the first transmission strip is configured to generate the first signal, and wherein the first transmission strip has a length corresponding to one quarter of a wavelength of the first distribution signal.

2. The transceiver of claim 1, wherein the receiver includes:

a reception antenna configured to receive an external signal to generate a reception frequency signal; and a second mixer configured to receive the reception frequency signal and a second local oscillation signal to output a reception conversion signal, and wherein the local signal transfer unit includes:

a second balun configured to receive a second distribution signal of the distribution signals to generate a second signal; and a second multiplier configured to receive the second signal from the second balun to output the second local oscillation signal by converting a frequency of the second signal.

3. The transceiver of claim 2, wherein the first distribution signal and the second distribution signal have a same frequency, and wherein the first local oscillation signal and the second local oscillation signal have a same frequency.

4. The transceiver of claim 3, wherein the first multiplier outputs the first local oscillation signal by converting the frequency of the first signal to a doubled frequency, and wherein the second multiplier outputs the second local oscillation signal by converting the frequency of the second signal to a doubled frequency.

5. The transceiver of claim 4, wherein the first balun and the second balun are marchand baluns.

6. The transceiver of claim 4, wherein the first balun and the second balun have a "□" shape.

7. The transceiver of claim 4, wherein the first balun and the second balun have a meandered shape.

8. The transceiver of claim 4, wherein the first signal includes a pair of differential signals having a same frequency and opposite phases.

9. The transceiver of claim 1, wherein the first mixer is configured to beat the transmission frequency signal with a frequency of the first local oscillation signal to output the transmission conversion signal.

10. The transceiver of claim 1, wherein a frequency of the transmission conversion signal is a sum of a frequency of the transmission frequency signal and a frequency of the first local oscillation signal.

11. The transceiver of claim 1, wherein a frequency of the first local oscillation signal is 100 GHz to 10 THz.

12. The transceiver of claim 1, wherein the third multiplier is configured to output the reference conversion signal by converting a frequency of the reference oscillation signal by an integer multiple.

13. A method of providing a local oscillation signal to a mixer, the method comprising:

generating a reference oscillation signal from a local signal oscillator;

generating distribution signals from a power divider by receiving the reference oscillation signal;

generating a differential signal from a balun by receiving a first distribution signal among the distribution signals; and receiving the differential signal, outputting the local oscillation signal from a first multiplier, and providing the local oscillation signal to the mixer, wherein the receiving the reference oscillation signal includes receiving the reference oscillation signal by a second multiplier, outputting a reference conversion signal from the second multiplier, and generating the distribution signals from the reference conversion signal, wherein the balun includes a reception strip and a first transmission strip, wherein the reception strip is configured to receive the first distribution signal and the first transmission strip is configured to generate the differential signal, and wherein the first transmission strip has a length corresponding to one quarter of a wavelength of the first distribution signal.

14. The method of claim 13, wherein the balun is a marchand balun.

15. The method of claim 13, wherein the first multiplier outputs the local oscillation signal by converting a frequency of the differential signal to twice the frequency.

16. The method of claim 13, wherein a frequency of the local oscillation signal is twice a frequency of the differential signal.

17. The method of claim 13, wherein a frequency of the local oscillation signal is 100 GHz to 10 THz.

18. The method of claim 13, wherein the balun has a "□" shape.

19. The method of claim 13, wherein the balun has a meandered shape.

* * * * *